Aug. 8, 1939.  O. JACOBSEN  2,168,903

LUBRICATED PLUG VALVE

Filed April 14, 1938   2 Sheets—Sheet 1

INVENTOR
OYSTEIN JACOBSEN

By James C. Bradley
ATTORNEY.

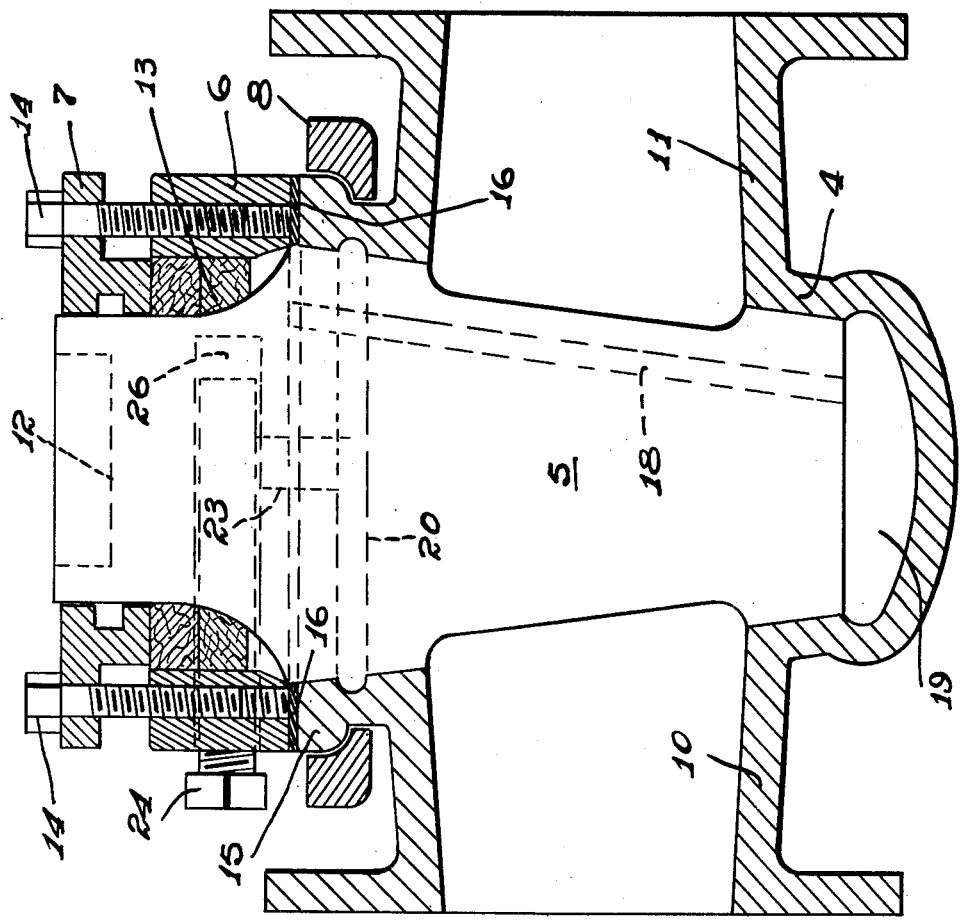

Patented Aug. 8, 1939

2,168,903

UNITED STATES PATENT OFFICE 2,168,903

LUBRICATED PLUG VALVE

Oystein Jacobsen, Dayton, Ohio, assignor to The Duriron Company, Inc., a corporation of New York Application April 14, 1938, Serial No. 201,993

4 Claims. (Cl. 251—93)

Figure 1:
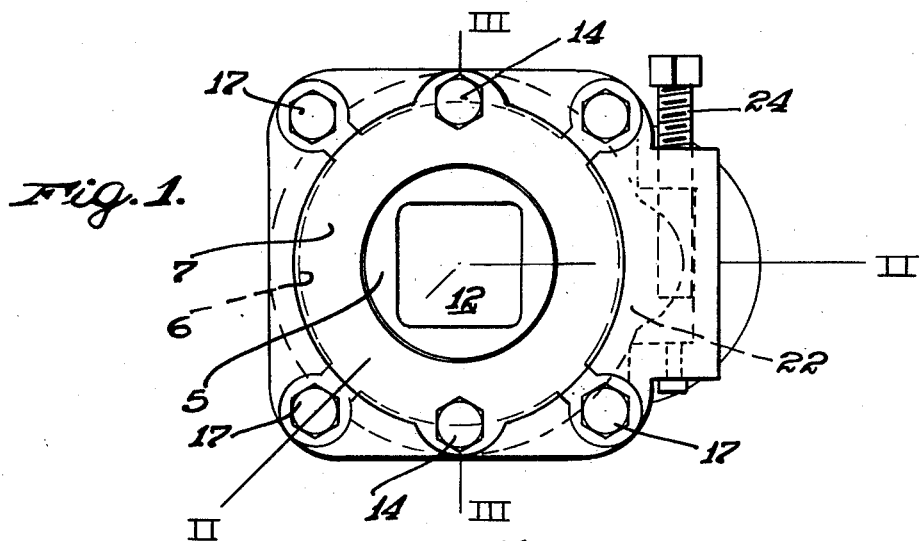
Figure 2:
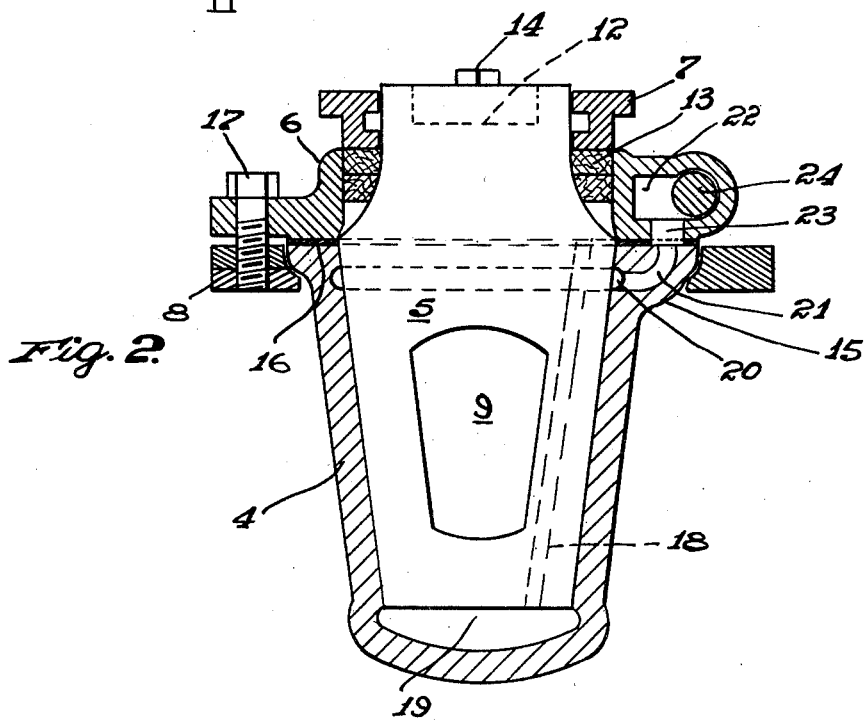

The invention relates to lubricated cocks or valves, particularly of the type employing parts of corrosion resisting composition, although the invention is not limited to valves of such composition, the present structure involving an improvement over that of my Patent No. 2,048,386, dated July 12, 1936. It has for its principal objects, the provision of an improved valve of very simple construction, in which the valve cap or bonnet which carries the stuffing box is utilized as the carrier of the pressure lubricant chamber embodied in a structure of very compact design. One embodiment of the invention is illustrated in the accompanying drawings, wherein:

Figure 1 is a plan view of the assembly. And Figs. 2 and 3 are sections through the assembly on the lines II—II and III—III respectively of Fig. 1.

Referring to the drawings, 4 is the valve casing; 5 is the plug or cock; 6 is the cap or bonnet; 7 is the stuffing box follower, which parts are preferably of corrosion resisting material; and 8 is a clamping ring or collar of steel, bronze or other tough, strong metal. The plug has the opening 9 therethrough which registers with the inlet and outlet branches 10 and 11 of the casing, when the cock is in open position. The plug 5 has the usual stem provided with a recess 12 for a turning tool, and is surrounded by the packing 13 which is compressed by the follower 7, the usual screws 14 threaded into the cap 6 serving to operate the follower.

The casing 4 is provided at its upper end with a laterally extending flange 15, and the upper face of this flange opposes the lower face of the cap 6, a gasket 16 being interposed to insure a seal. The flange 15 acts as a retaining abutment for the clamping ring or collar 8 and a clamping action is provided by the use of the four bolts 17, which extend through the collar 8 and the flange on the cap, as indicated in Fig. 2.

The valve casing is provided at its surface next to the plug with a longitudinal groove 18 which communicates at its lower end with the chamber 19 formed in the casing 4 beneath the end of the plug, the upper end of the groove communicating with a circumferential groove 20 adjacent the upper end of the plug. A passage 21 in the casing communicates at its lower end with the groove 20 and extends upward and laterally through the flange 15 to the upper face thereof, as shown in Fig. 2. The cap 6 carries in its wall an elongated lubricant chamber 22 which extends transversely of the axis of rotation of the plug and communicates with the upper end of the passage 21 via the passage 23. Threaded through the wall of the chamber 22 (Fig. 3) is the screw 24.

When the screw 24 is advanced, it applies pressure to the lubricant in the chamber 22 feeding it through the passages 23 and 21 to groove 20, and thence through the groove 18 to the chamber 19. The operation of the screw at suitable intervals insures the lubrication of the plug 1 and, if such valve sticks on its seat, it may be freed by turning the screw to such an extent that the pressure accumulated in the chamber 19 lifts the plug and frees it. It will be understood that the grooves 18 and 20 may be located either in the casing, as shown, or in the plug, this being a matter of choice well known in the art, all that is necessary being the location of the grooves at the meeting surfaces of the casing and plug. It will be further understood that the collar 8 must be of a sectional type permitting its assembly on the casing, such as that of my Patent No. 2,049,204, dated July 28, 1936.

What I claim is:

1. In combination in a plug cock, a casing open at its upper end which is provided with a lateral flange and having a tapering seat and a chamber for lubricant below the seat, a tapering valve plug with a stem at its upper end fitting the seat, a groove being provided longitudinally of the meeting surfaces of the plug and seat opening at its lower end into said chamber, a communication in the wall of the casing leading from the upper end of said groove upward through said lateral flange to the upper surface thereof, a cap for the casing seated on said flange and provided with a stuffing box for the stem of the valve plug, means for clamping the cap to said flange, a lubricant chamber comprising a cavity located in the cap, a communication being provided from said chamber registering at its lower end with the end of said first communication, and a screw threaded through the wall of said last chamber and adapted, when screwed inward, to apply pressure to the lubricant in the chamber so as to move the plug endwise with respect to its seat, said screw extending transversely of the radius of the plug.

2. In combination in a plug cock, a casing open at its upper end which is provided with a lateral flange and having a tapering seat and a chamber for lubricant below the seat, a tapering valve plug with a stem at its upper end fitting the seat, a groove being provided longitudinally of the meeting surfaces of the plug and seat opening at its lower end into said chamber, and a circumferential groove being provided at the meeting surfaces of the plug and seat at the upper end of the plug and communicating with the first groove, a communication in the wall of the casing leading from the circumferential groove upward through said lateral flange to the upper surface thereof, a cap for the casing seated on said flange and provided with a stuffing box for the stem of the valve plug, means for clamping the cap to said flange, a lubricant chamber comprising a cavity located in the cap, a communication being provided from said chamber registering at its lower end with the end of said first communication, and a screw threaded through the wall of such last chamber and adapted, when screwed inward, to apply pressure to the lubricant in the chamber so as to move the plug endwise with respect to its seat, said screw extending transversely of the radius of the plug.

3. In combination in a plug cock, a casing open at its upper end which is provided with a lateral flange and having a tapering seat and a chamber for lubricant below the seat, a tapering valve plug with a stem at its upper end fitting the seat, a groove being provided longitudinally of the meeting surfaces of the plug and seat opening at its lower end into said chamber, a communication in the wall of the casing leading from the upper end of said groove upward through said lateral flange to the upper surface thereof, a circumferentially flanged cap for the casing seated on said flange making seating contact therewith and provided with a stuffing box for the stem of the valve plug, a clamping collar below said lateral flange on the casing, clamping bolts between the flange on the cap and said collar, a lubricant chamber comprising a cavity located in the cap, a communication being provided from said chamber registering at its lower end with the end of said first communication, and a screw threaded through the wall of such last chamber and adapted, when screwed inward, to apply pressure to the lubricant in the chamber so as to move the plug endwise with respect to its seat, said screw extending transversely of the radius of the plug.

4. In combination in a plug cock, a casing the upper end of which is open and is provided with a peripheral flange, the casing being formed with a downwardly tapering valve plug seat, the lower end of the casing being closed and providing a chamber for lubricant below the seat, said casing, further, having inlet and outlet branches, a tapering valve plug resting upon the seat and having a stem at its upper end, said valve plug having a transverse opening therethrough registering with the inlet and outlet branches, a groove being provided longitudinally of the meeting surfaces of the valve plug and the seat and opening at its lower end into said chamber, a groove intersecting the first groove, also formed at said meeting surfaces and extending circumferentially of the plug, the casing having a communication formed in the wall thereof and leading from the peripheral groove upwardly through the upper surface of the lateral flange, a cap for the casing seated on said flange and being provided with a suffing box for the stem of the valve plug, means for clamping the cap to said flange, said cap having a lubricant chamber formed therein, a communication being provided in the cap from the chamber registering at its lower end with the end of the communication in the casing wall, a screw threaded through the wall of the chamber and adapted when screwed inwardly to apply pressure to the lubricant in the chamber to move the plug endwise with respect to its seat.

O. JACOBSEN.